US009772460B2

United States Patent
Kucharski et al.

(10) Patent No.: US 9,772,460 B2
(45) Date of Patent: Sep. 26, 2017

(54) METHOD AND SYSTEM FOR IMPLEMENTING HIGH-SPEED INTERFACES BETWEEN SEMICONDUCTOR DIES IN OPTICAL COMMUNICATION SYSTEMS

(75) Inventors: Daniel Kucharski, San Marcos, CA (US); John Andrew Guckenberger, San Diego, CA (US); Thierry Pinguet, Cardiff-by-the-Sea, CA (US); Sherif Abdalla, Carlsbad, CA (US)

(73) Assignee: Luxtera, Inc., Carlsbad, CA (US)

( * ) Notice: Subject to any disclaimer, the term of this patent is extended or adjusted under 35 U.S.C. 154(b) by 1983 days.

(21) Appl. No.: 13/033,439

(22) Filed: Feb. 23, 2011

(65) Prior Publication Data

US 2011/0206322 A1 Aug. 25, 2011

Related U.S. Application Data

(60) Provisional application No. 61/338,690, filed on Feb. 23, 2010.

(51) Int. Cl.
  *G02B 6/42* (2006.01)
(52) U.S. Cl.
  CPC .......... *G02B 6/4274* (2013.01); *G02B 6/4286* (2013.01)
(58) Field of Classification Search
  CPC ....... G02B 6/4201; G02B 6/4274; G02B 6/43
  See application file for complete search history.

(56) References Cited

U.S. PATENT DOCUMENTS

| | | | | |
|---|---|---|---|---|
| 6,737,887 B2* | 5/2004 | Forbes | ................ | H04L 25/0282 326/27 |
| 6,950,314 B2* | 9/2005 | Reznik | ................... | H01R 12/62 174/254 |
| 8,171,625 B1* | 5/2012 | Veitch | .................. | G02B 6/4204 29/592.1 |
| 8,238,014 B2* | 8/2012 | Kucharski | ............... | G02F 1/225 359/238 |
| 8,687,981 B2* | 4/2014 | Welch | ................. | H04L 25/0272 330/124 R |
| 8,831,437 B2* | 9/2014 | Dobbelaere | ............. | H01L 21/84 398/138 |

(Continued)

*Primary Examiner* — Brian Misiura
(74) *Attorney, Agent, or Firm* — McAndrews, Held & Malloy

(57) ABSTRACT

A method and system for implementing high-speed electrical interfaces between semiconductor dies in optical communication systems are disclosed and may include communicating electrical signals between an electronics die and an optoelectronics die via coupling pads which may be located in low impedance points in Tx and Rx paths. The electrical signals may be communicated via one or more current-mode, controlled impedance, and/or capacitively-coupled interfaces. The current-mode interface may include a cascode amplifier stage split between source and drain terminals of transistors on the dies. The controlled-impedance interfaces may include transmission line drivers on a first die and transmission lines on a second die. The capacitively-coupled interfaces may include capacitors formed by contact pads on the dies. The coupling pads may be connected via one or more of: wire bonds, metal pillars, solder balls, or conductive resin. The dies may comprise CMOS and may be coupled in a flip-chip configuration.

26 Claims, 5 Drawing Sheets

(56) References Cited

U.S. PATENT DOCUMENTS

| | | | |
|---|---|---|---|
| 8,877,616 B2* | 11/2014 | Pinguet | H01L 21/84 |
| | | | 257/351 |
| 9,497,860 B2* | 11/2016 | Kim | H05K 3/403 |
| 2009/0022500 A1* | 1/2009 | Pinguet | G02B 6/1228 |
| | | | 398/164 |

* cited by examiner

METHOD AND SYSTEM FOR IMPLEMENTING HIGH-SPEED INTERFACES BETWEEN SEMICONDUCTOR DIES IN OPTICAL COMMUNICATION SYSTEMS

CROSS-REFERENCE TO RELATED APPLICATIONS/INCORPORATION BY REFERENCE

This application makes reference to and claims priority to U.S. Provisional Application Ser. No. 61/338,690 filed on Feb. 23, 2010, which is hereby incorporated herein by reference in its entirety.

FEDERALLY SPONSORED RESEARCH OR DEVELOPMENT

[Not Applicable]

MICROFICHE/COPYRIGHT REFERENCE

[Not Applicable]

FIELD OF THE INVENTION

Certain embodiments of the invention relate to signal processing. More specifically, certain embodiments of the invention relate to a method and system for implementing high-speed electrical interfaces between semiconductor dies in optical communication systems.

BACKGROUND OF THE INVENTION

As data networks scale to meet ever-increasing bandwidth requirements, the shortcomings of copper data channels are becoming apparent. Signal attenuation and crosstalk due to radiated electromagnetic energy are the main impediments encountered by designers of such systems. They can be mitigated to some extent with equalization, coding, and shielding, but these techniques require considerable power, complexity, and cable bulk penalties while offering only modest improvements in reach and very limited scalability. Free of such channel limitations, optical communication has been recognized as the successor to copper links.

Optical communication systems have been widely adopted for applications ranging from internet backbone, local area networks, data centers, supercomputing, to high-definition video. Due to superior bandwidth and low loss, optical fibers are the medium of choice for transporting high-speed binary data.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for implementing high-speed electrical interfaces between semiconductor dies in optical communication systems, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain aspects of the invention may be found in a method and system for implementing high-speed electrical interfaces between semiconductor dies in optical communication systems. Exemplary aspects of the invention may comprise communicating electrical signals between an electronics die and an optoelectronics die via coupling pads on the electronics die and the optoelectronics die in an optical communication system. The coupling pads may be located at low impedance points in one or more transmit paths and/or one or more receive paths in the optical communication system. The electrical signals may be communicated via one or more current-mode interfaces that may comprise a cascode amplifier stage split between source terminals of transistors on the electronics die and drain terminals of transistors on the optoelectronics die. The electrical signals may be communicated via one or more controlled-impedance interfaces that may comprise one or more transmission line drivers on a first die and one or more transmission lines on a second die of the optical communication system. The electrical signals may be communicated via one or more capacitively-coupled interfaces that may comprise capacitors formed by one or more of the contact pads on the electronics die and one or more of the contact pads on the optoelectronics die. The electrical signals may be communicated via one or more inductively-coupled interfaces. The coupling pads may be connected via one or more of: wire bonds, metal pillars, solder balls, or conductive resin. The electronics die and the optoelectronics die may comprise CMOS dies. The electronics die and the optoelectronics die may be coupled in a flip-chip configuration.

Figure 1:
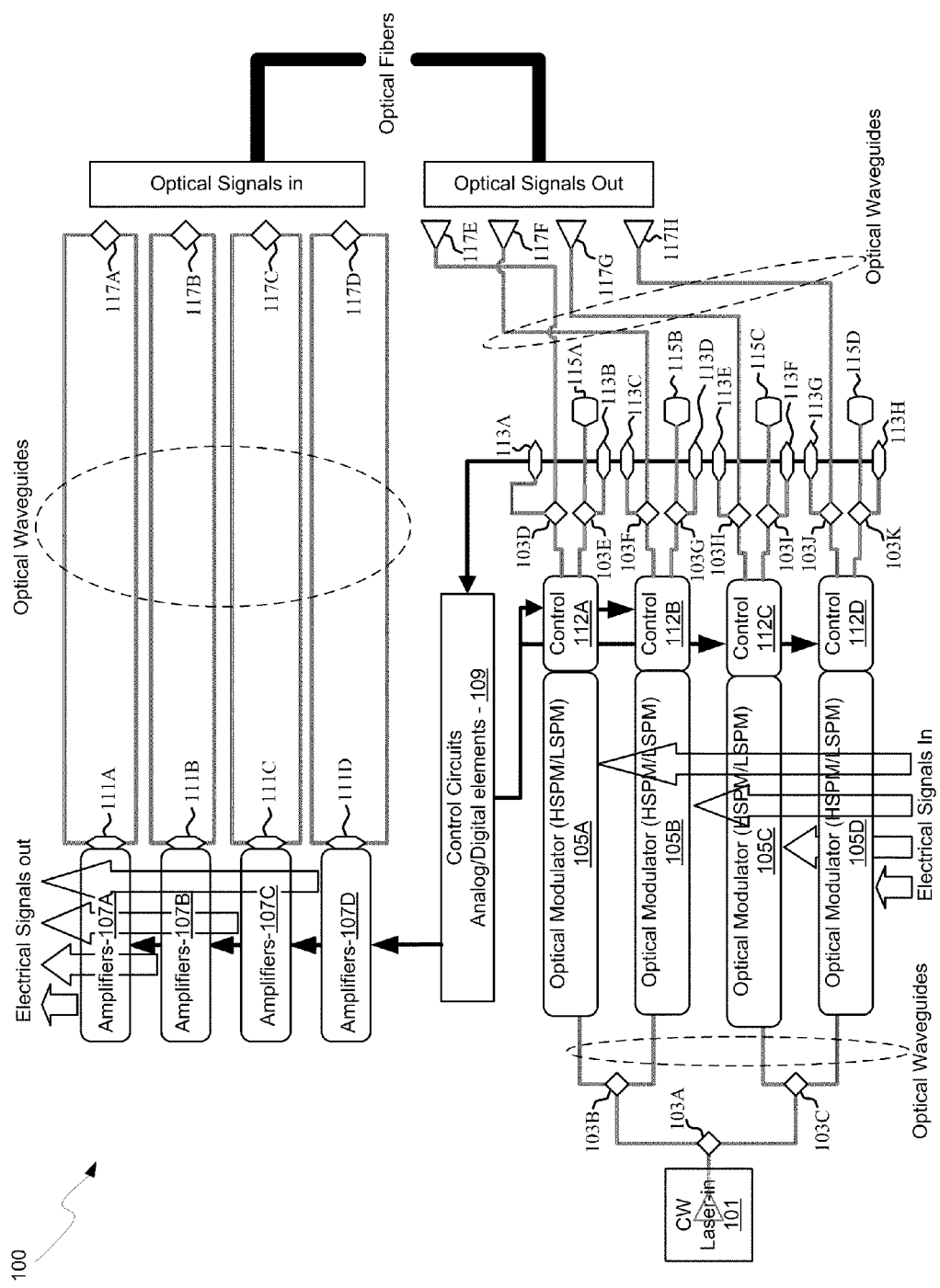
FIG. 1 is a block diagram of a photonically enabled CMOS optical communication system, in accordance with an embodiment of the invention.

FIG. 1 is a block diagram of a photonically-enabled CMOS optical communication system, in accordance with an embodiment of the invention. Referring to FIG. 1, there is shown optoelectronic devices comprising optical modulators 105A-105D, photodiodes 111A-111D, monitor photodiodes 113A-113H, and optical devices comprising taps 103A-103K, optical terminations 115A-115D, and grating couplers 117A-117H. There are also shown electrical devices and circuits comprising amplifiers 107A-107D, analog and digital control circuits 109, and control sections 112A-112D. The amplifiers 107A-107D may comprise transimpedance and limiting amplifiers (TIA/LAs), for example.

Optical signals are communicated between optical and optoelectronic devices via optical waveguides fabricated in the chip or chips comprising the devices.

The optical modulators 105A-105D comprise Mach-Zehnder or ring modulators, for example, and enable the modulation of the CW laser input signal. The optical modulators 105A-105D comprise high-speed and low-speed phase modulation sections and are controlled by the control sections 112A-112D. The high-speed phase modulation section of the optical modulators 105A-105D may modulate a CW light source signal with a data signal. The low-speed phase modulation section of the optical modulators 105A-105D may compensate for slowly varying phase factors such as those induced by mismatch between the waveguides, waveguide temperature, or waveguide stress and is referred to as the passive phase, or the passive biasing of the MZI.

The phase modulators may have a dual role: to compensate for the passive biasing of the MZI and to apply the additional phase modulation used to modulate the light intensity at the output port of the MZI according to a data stream. The former phase tuning and the latter phase modulation may be applied by separate, specialized devices, since the former is a low speed, slowly varying contribution, while the latter is typically a high speed signal. These devices are then respectively referred to as the LSPM and the HSPM. Examples for LSPM are thermal phase modulators (TPM), where a waveguide portion is locally heated up to modify the index of refraction of its constituting materials, or forward biased PIN junctions (PINPM) where current injection into the PIN junction modifies the carrier density, and thus the index of refraction of the semiconductor material. An example of an HSPM is a reversed biased PIN junction, where the index of refraction is also modulated via the carrier density, but which allows much faster operation, albeit at a lower phase modulation efficiency per waveguide length.

The outputs of the modulators may be optically coupled via waveguides to the grating couplers 117E-117H. The taps 103D-103K comprise four-port optical couplers, for example, and are utilized to sample the optical signals generated by the optical modulators 105A-105D, with the sampled signals being measured by the monitor photodiodes 113A-113H. The unused branches of the taps 103D-103K are terminated by optical terminations 115A-115D to avoid back reflections of unwanted signals.

The grating couplers 117A-117H comprise optical gratings that enable coupling of light into and out of the chip or chips comprising the optical gratings 117A-117H. The grating couplers 117A-117D may be utilized to couple light received from optical fibers into a photonically-enabled CMOS chip, and the grating couplers 117E-117H may be utilized to couple light from the photonically-enabled CMOS chip into optical fibers. The grating couplers 117A-117H may comprise single polarization grating couplers (SPGC) and/or polarization splitting grating couplers (PSGC). In instances where a PSGC is utilized, two input, or output, waveguides may be utilized.

The optical fibers may be epoxied, for example, to the photonically-enabled CMOS chip, and may be aligned at an angle from normal to the surface of the chip to optimize coupling efficiency. In an embodiment of the invention, the optical fibers may comprise single-mode fiber (SMF) and/or polarization-maintaining fiber (PMF).

In another exemplary embodiment, optical signals may be communicated directly into the surface of the photonically-enabled CMOS chip without optical fibers by directing a light source on an optical coupling device in the chip, such as the light source interface 135 and/or the optical fiber interface 139. This may be accomplished with directed laser sources and/or optical sources on another chip flip-chip bonded to the photonically-enabled CMOS chip.

The photodiodes 111A-111D may convert optical signals received from the grating couplers 117A-117D into electrical signals that are communicated to the amplifiers 107A-107D for processing. The photodiodes 111A-111D may comprise high-speed heterojunction photodiodes, for example, and may comprise germanium (Ge) in the collector and base regions for absorption in the 1.55 µm optical wavelength range, and may be integrated on a CMOS silicon-on-insulator (SOI) wafer. In another embodiment of the invention, the photodiodes 111A-111D may instead comprise phototransistors.

The analog and digital control circuits 109 may control gain levels or other parameters in the operation of the amplifiers 107A-107D, which may then communicate electrical signals to other circuitry, such as in a deep sub-micron CMOS chip with for further digital signal processing, for example. In an embodiment of the invention, the plurality of optical, optoelectronic, and electronic devices in the photonically-enabled CMOS optical communication system 100 may be integrated in different chips depending on the speed and other device requirements. For example, complex, high-speed digital processing may be performed on electronic devices in a deep sub-micron CMOS chip that is communicatively coupled to a photonically-enabled CMOS chip comprising optical, electrical, and optoelectronic devices.

The control sections 112A-112D comprise electronic circuitry that enable modulation of the CW laser signal received from the splitters 103A-103C. The optical modulators 105A-105D require high-speed electrical signals to modulate the refractive index in respective branches of a Mach-Zehnder interferometer (MZI), for example. In an embodiment of the invention, the control sections 112A-112D may include sink and/or source driver electronics that may enable a bidirectional link utilizing a single laser.

The chips comprising the photonically-enabled CMOS optical communication system 100 may comprise semiconductor-on-insulator (SOI), bulk silicon, silicon-on-sapphire, indium phosphide, indium-gallium-nitride, indium-gallium-arsenide, gallium arsenide, or an organic polymer, for example.

As complexity and data throughput of optical communication systems increase, it is often inefficient, difficult, or even impossible to monolithically integrate all system sub-components on a single semiconductor die. This may be caused by diversity of semiconductor technologies and materials used in constructing such systems. Some of these technologies are either highly specialized or are optimized for a fairly narrow range of applications. For example, III-V semiconductors excel in light generation and detection, SiGe HBT technologies work very well in high-speed analog and mixed signal applications, and deep submicron CMOS provides speed and density necessary for implementing complex digital functions and signal processing on VLSI scale, with a wide variety of existing digital cores readily available for integration. Overlaps between these technologies exist in some areas, but in many cases it may be more efficient to choose the right technology for each function. This approach may enable systems to be assembled from multiple semiconductor dies. Electrical interfaces between these dies may create performance bottlenecks or lead to inefficiencies, such as reduced transmission speed, increased timing jitter, or additional power consumption.

In an embodiment of the invention, high-speed electronic devices and circuits may be integrated on a CMOS VLSI chip and optical, optoelectronic, and electronic devices may be integrated on a second photonically-enabled CMOS chip. The chips may be configured adjacent to each other or may be configured face-to-face in a flip-chip configuration. Coupling techniques may comprise wire bonds, solder balls, metal pillars, conductive resin, and/or proximity interconnects such as capacitively-coupled interfaces or inductively-coupled interfaces. Capacitively-coupled interfaces may comprise metal pads on adjacent chips comprising capacitors for AC-coupling of signals, whereas inductively-coupled interfaces may comprise inductor coils on adjacent chips with signals being communicated between chips via inductive coupling between the coils.

In operation, the photonically-enabled CMOS optical communication system 100 may be operable to transmit and/or receive and process optical signals. The grating couplers 117A-117D may be operable to receive optical signals from optical fibers coupled to a photonically-enabled CMOS chip, and may convert the optical mode of the fiber into the much smaller mode of a Si waveguide fabricated on the photonically-enabled CMOS SOI wafer. The grating couplers 117A-117D may comprise a single-polarization or a polarization-splitting type: in the first case, only a specific polarization is coupled to a single Si waveguide, while in the second case, two orthogonal polarizations are split into two output waveguides.

In an exemplary embodiment of the invention, optical, electrical, and optoelectronic devices may be integrated on chips that may be optimized for a particular device. For example, optical and optoelectronic, and some electronic devices may be integrated on a photonically-enabled CMOS chip whereas high-speed electronic devices may be integrated on an adjacent deep sub-micron CMOS chip. The coupling of the two chips may then be configured to minimize effects from parasitic impedances. For example, in a current-mode interface, the interconnect may be configured between transistors in a cascode configuration with one pair of transistors on one chip an open-drain configuration and another pair of transistors on a second chip in the cascode configuration.

In addition, in a controlled-impedance interface, configurable impedance transmission lines may be utilized on a photonically-enabled CMOS chip to match impedance with low input impedance of Tx amplifiers in a deep sub-micron CMOS chip, which also mitigates the effects of parasitic impedances resulting from the interconnect between chips.

Figure 2:
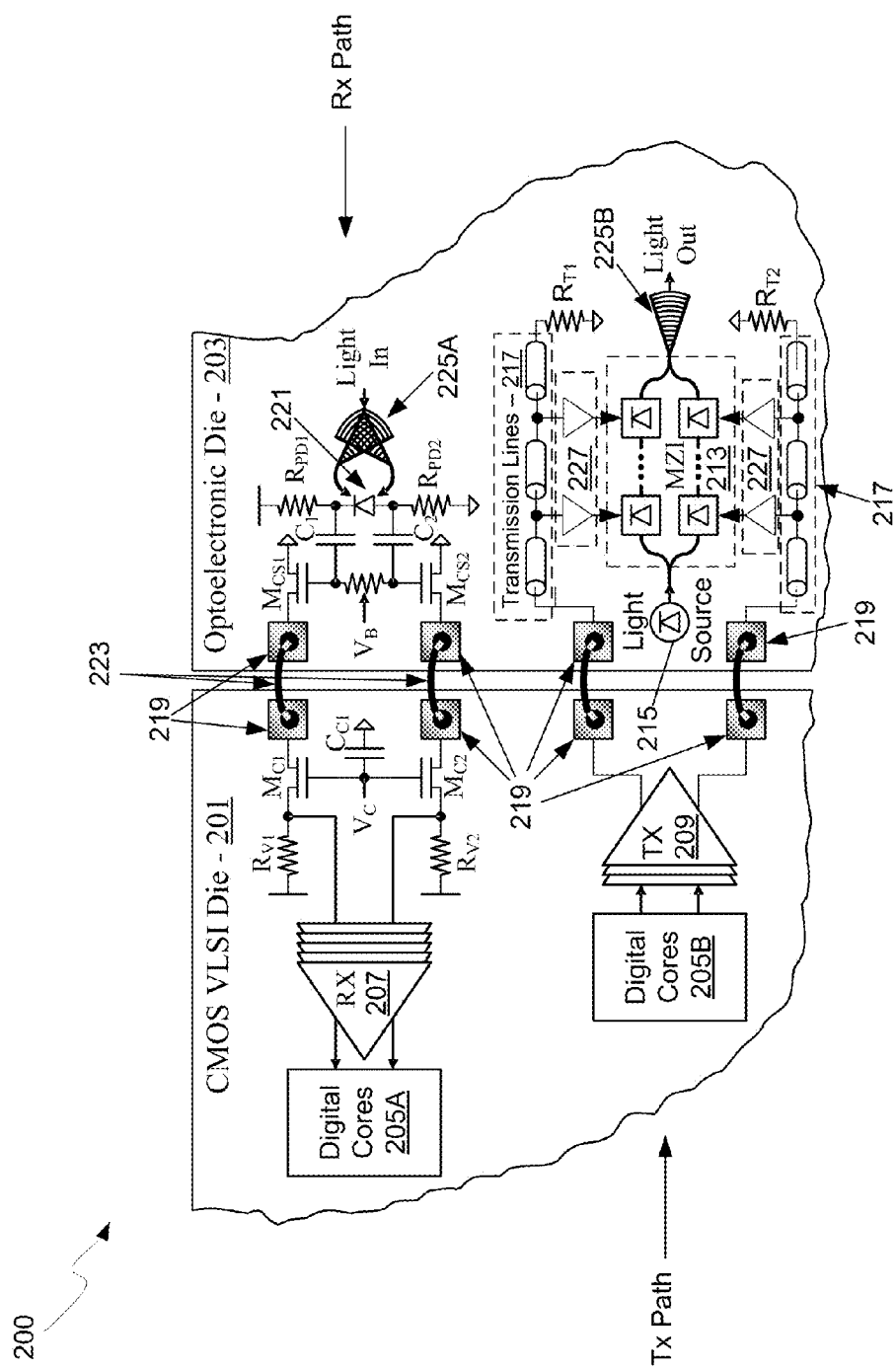
FIG. 2 is a block diagram of split receiver and transmitter electrical interfaces, in accordance with an embodiment of the invention.

FIG. 2 is a block diagram of split receiver and transmitter electrical interfaces, in accordance with an embodiment of the invention. Referring to FIG. 2, there is shown a photonically-enabled CMOS optical communication system 200 comprising a CMOS very-large-scale-integration (VLSI) die 201 and a CMOS optoelectronics die 203. The Tx path in the lower half of the dies comprises a controlled-impedance interface, whereas the Rx path in the upper half of the dies comprises a current-mode interface.

The CMOS optoelectronics die 203 comprises passive optical structures, such as grating couplers 225A and 225B, waveguides, splitters, and combiners. The CMOS optoelectronics die 203 also comprises active optoelectronic elements such as the photodetector 221 for the purpose of detecting optical signals in receivers and optical phase modulators. The phase modulators may be configured to function as Mach-Zehnder interferometers, such as the MZI 213, for the purpose of modulating optical signals in transmitters. The optoelectronics die also comprises a common-source pair comprising transistors $M_{CS1}$ and $M_{CS2}$, resistors $R_{PD1}$, $R_{PD2}$, $R_{T1}$, $R_{T2}$ and $R_B$, capacitors $C_1$ and $C_2$, and other integrated circuit elements. The invention is not limited to the number of optical, optoelectronic, and electronic devices shown, as it comprises representative sections of the chips. The CMOS optoelectronics die 203 also comprises transmission lines 217, a light source 215, unit drivers 227, coupling pads 219, and a bias voltage $V_B$.

The CMOS VLSI die 201 comprises digital cores 205A and 205B, receiver (Rx) gain stages 207, transmitter (Tx) gain stages 209, CMOS transistors $M_{C1}$ and $M_{C2}$, capacitor $C_{C1}$, bias resistors $R_{V1}$ and $R_{V2}$, coupling pads 219, and a bias voltage $V_C$. The Rx gain stages 207 and the Tx gain stages 209 may comprise suitable gain control elements for communicating signals to and from the digital cores 205A and 205B. The Tx gain stages 209 may comprise transmission line drivers for communicating electrical signals from the CMOS VLSI die 201 and the transmission lines 217 on the optoelectronics die 203.

The digital cores 205A and 205B may comprise high-speed digital processing cores, for example, that may be operable to generate signals to be transmitted and/or process received signals. The transistors $M_{C1}$ and $M_{C2}$ may comprise a cascode configuration, such that the impedance seen at the coupling pads 219 may be low. In this manner, the interface between the CMOS VLSI die 201 and the CMOS optoelectronics die 203 may be less sensitive to parasitic impedances.

The coupling between the CMOS VLSI die 201 and the optoelectronics die 203 is not limited to wire bonds, as illustrated by the wire bonds 223 in FIG. 2. Accordingly, other techniques may be utilized, such as solder balls, metal pillars, conductive resin, and/or proximity interconnects, which may comprise capacitively-coupled interfaces or inductively-coupled interfaces, for example. Capacitively-coupled interfaces may comprise the coupling pads 219 on adjacent chips comprising capacitors for AC-coupling of signals, whereas inductively-coupled interfaces may comprise inductor coils on adjacent chips with signals being communicated between chips via inductive coupling between the coils.

In operation, the optical receiver interface may utilize transistors available on the CMOS optoelectronics die 203. In an exemplary embodiment, the pair of NMOS transistors $M_{CS1}$ and $M_{CS2}$ may be in a common-source configuration with the drain terminals coupled to the coupling pads 219. The CMOS transistors $M_{CS1}$ and $M_{CS2}$ may communicate modulated currents to another pair of NMOS transistors $M_{C1}$ and $M_{C2}$ in cascode configuration on the CMOS VLSI die 201. The input impedance looking into source terminals of these cascode devices may be very low, and they may accept the currents transmitted by the common-source transistor pair without creating large voltage signals. Low impedance may desensitize this type of interface to parasitic inductance, capacitance, and resistance associated with pads, bond wires, or other interconnect elements. The transmitted currents may then be converted to a voltage signal on the CMOS VLSI die 201 by a pair of resistors $R_{V1}$ and $R_{V2}$ connected to drain terminals of the cascode transistors $M_{C1}$ and $M_{C2}$. The voltage signal may be further amplified by subsequent voltage gain stages, the Rx gain stages 207, until it reaches an amplitude suitable for use by the digital cores 205A.

The bias voltage $V_B$ may be operable to bias the common-source pair comprising $M_{CS1}$ and $M_{CS2}$ and the resistors $R_{PD1}$ and $R_{PD2}$ may be operable to bias the photodiode 221. An electrical signal may be generated by the photodiode 221 in response to an input light signal. The generated signal may be AC-coupled via the capacitors $C_1$ and $C_2$ to the gate terminals of the transistors $M_{CS1}$ and $M_{CS2}$ for communication to the CMOS VLSI die 201 via the cascode circuit comprising $M_{C1}$ and $M_{C2}$.

The transmission lines 217 may comprise tunable impedances for matching to prior gain stages, such as the Tx gain stages 209, and may also provide a low impedance for reduced sensitivity to parasitic impedances in the coupling between the CMOS VLSI die 201 and the optoelectronics die 203. The signals received from the CMOS VLSI die 201 may be communicated to the unit drivers 227, which may be operable to modulate CW optical signals in the MZI 213 received from the light source 215.

Figure 3:
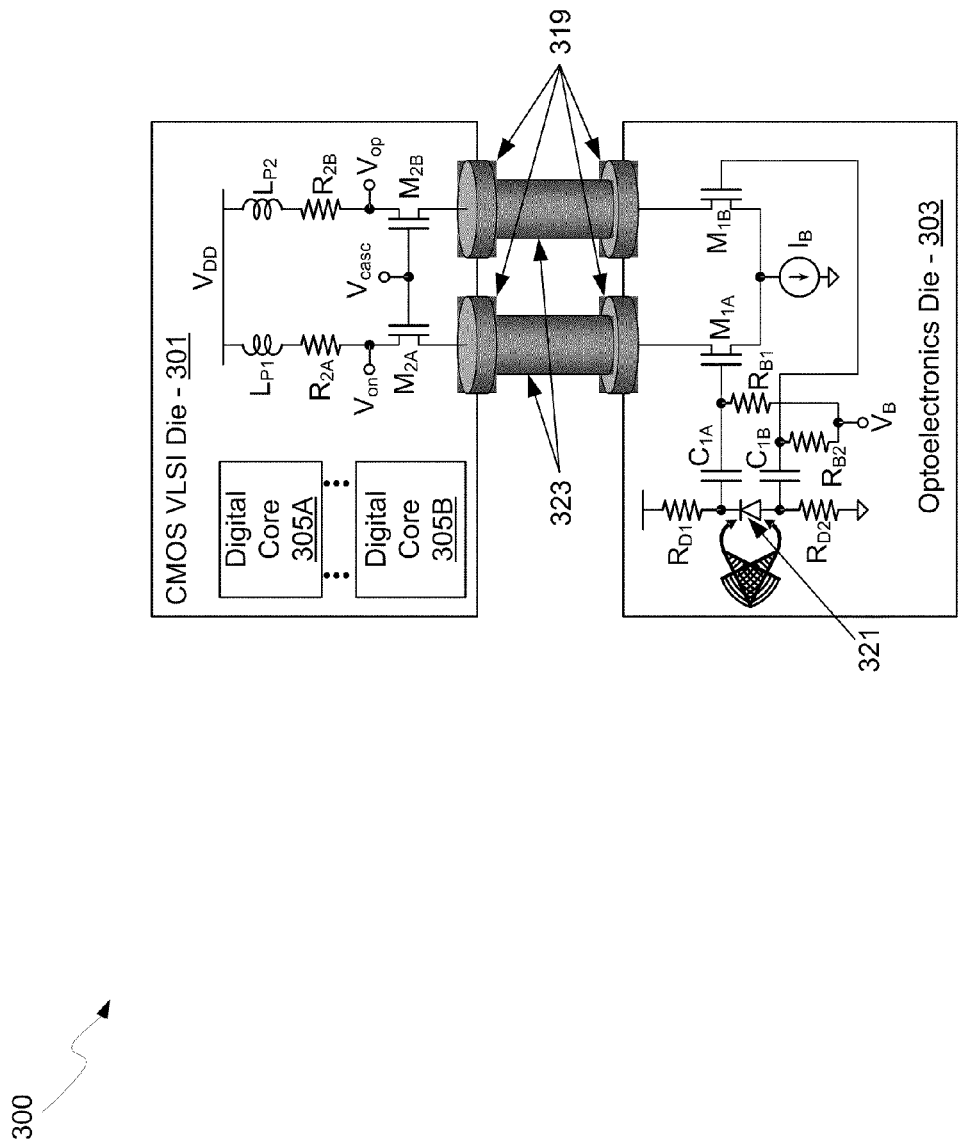
FIG. 3 is a block diagram of a flip-chip-type photonically-enabled CMOS optical receiver system, in accordance with an embodiment of the invention.

FIG. 3 is a block diagram of a flip-chip-type photonically-enabled CMOS optical receiver system, in accordance with an embodiment of the invention. Referring to FIG. 3, there is shown a photonically-enabled CMOS optical communication system 300 comprising a CMOS VLSI die 301, an optoelectronics die 303, and metal pillars 323. The CMOS VLSI die 301 comprises a plurality of digital cores shown as the digital cores 305A and 305B, transistors $M_{2A}$ and $M_{2B}$, resistors $R_{2A}$ and $R_{2B}$, inductors $L_{P1}$ and $L_{P2}$, and coupling pads 319. There is also shown control voltage $V_{Casc}$, supply voltage $V_{DD}$, and output voltages $V_{on}$ and $V_{op}$.

The optoelectronics die 303 comprises a photodiode 321, photodiode bias resistors $R_{D1}$ and $R_{D2}$, coupling capacitors $C_{1A}$ and $C_{1B}$, bias resistors $R_{B1}$ and $R_{B2}$, a current source $I_B$, and transistors $M_{1A}$ and $M_{1B}$. The transistors $M_{1A}$, $M_{2A}$, $M_{1B}$, and $M_{2B}$ comprise a differential cascode circuit for amplifying a signal generated by the photodiode 321. The metal pillars 323 may provide electrical interconnection as well as structural support between the CMOS VLSI die 301 and the optoelectronics die 303. The die may be configured in a face-to-face die attachment via metal pillars 323 instead of side-by-side dies connected with bond wires, for example, but the principle of operation and the advantages of low-impedance interfaces are the same.

In operation, the transistors $M_{1A}$ and $M_{1B}$ on the optoelectronics die 303 comprise a differential pair whose drains may be coupled to the metal pillars 323 that may communicate differential currents to the CMOS VLSI die 323. The cascode transistors $M_{2A}$ and $M_{2B}$ may receive the communicated currents that may be converted to a differential voltage signal via the resistors $R_{2A}$ and $R_{2B}$ and bandwidth-enhancing inductors $L_{P1}$ and $L_{P2}$. The optoelectronics die 303 comprises passive and active circuit elements to provide bias voltage for the integrated photodetector, to convert photocurrent to a voltage signal, and to couple the photo-generated signal to the gates of transistors $M_{1A}$ and $M_{1B}$.

Figure 4:
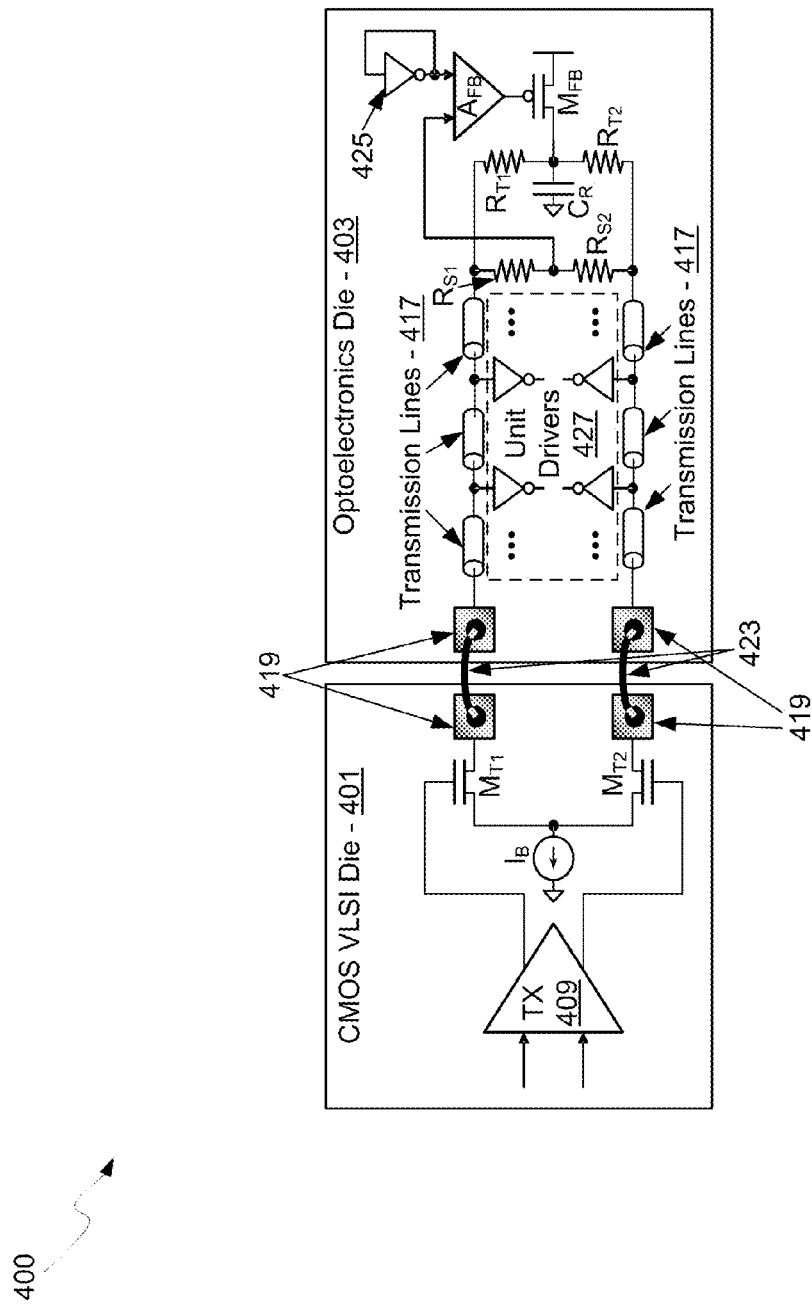
FIG. 4. is a block diagram illustrating a controlled-impedance split-transmitter interface, in accordance with an embodiment of the invention.

FIG. 4. is a block diagram illustrating a controlled-impedance split-transmitter interface, in accordance with an embodiment of the invention. Referring to FIG. 4, there is shown a photonically-enabled CMOS optical communication system 400 CMOS VLSI die 401, an optoelectronics die 403, and wire bonds 423.

In an exemplary embodiment, the CMOS optical communication system 400 comprises transmission lines 417 as a break point between the CMOS VLSI die 401 and the optoelectronics die 403, which may thus comprise a controlled-impedance interface. The resulting impedance may be relatively low, such as $Z_0=50\Omega$, thereby providing an insensitivity to parasitic inductance, capacitance, and resistance associated with pads, bond wires, or other interconnect elements.

The CMOS VLSI die may contain digital cores, such as the digital cores 205A, 205B, 305A, and 305B, described with respect to FIGS. 2 and 3, where the transmitted signal originates, as well as analog signal conditioning circuitry such as transmission line drivers. The CMOS VLSI die 401 also comprises Tx gain stages 409, a current source $I_B$, transistors $M_{T1}$ and $M_{T2}$, and coupling pads 419.

The optoelectronics die 403 comprises transmission lines 417, which may provide proper electrical to optical velocity matching for MZI operation. The optoelectronics die 403 also comprises distributed amplifier stages implemented with transistors, as illustrated schematically by the unit drivers 427. These distributed amplifiers may provide large signals to optical phase modulators in the MZI.

The optoelectronics die 403 also comprises sense resistors $R_{S1}$ and $R_{S2}$, termination resistors $R_{T1}$ and $R_{T2}$, a capacitor $C_R$, and a common-mode feedback circuit comprising a feedback gain stage AFB, a feedback control transistor $M_{FB}$, and a replica reference inverter 425. The common-mode feedback circuit may be operable to convert limited-swing current-mode logic (CML) signals to full-swing CMOS signals by matching the common mode voltage on the transmission lines 417 to the transition threshold of the unit drivers 427.

In operation, signals for transmission may be generated in one or more digital cores in the CMOS VLSI die 401 and communicated to the gate terminals of the transistors $M_{T1}$ and $M_{T2}$ comprising a differential pair. The signal amplified by the differential pair may be communicated to the optoelectronics die 403 via the coupling pads 419, which may be coupled between die using the wire bonds 423.

The coupling between the CMOS VLSI die 401 and the optoelectronics die 403 is not limited to wire bonds, as illustrated by the wire bonds 423 in FIG. 4. Accordingly, other techniques may be utilized, such as solder balls, metal pillars, conductive resin, and/or proximity interconnects, which may comprise capacitively-coupled interfaces or inductively-coupled interfaces, for example. Capacitively-coupled interfaces may comprise the coupling pads 419 on adjacent chips comprising capacitors for AC-coupling of signals, whereas inductively-coupled interfaces may comprise inductor coils on adjacent chips with signals being communicated between chips via inductive coupling between the coils.

The transmission lines 417 may provide tunable impedances for matching to prior gain stages, such as the differential pair $M_{T1}$ and $M_{T2}$, and may also provide a low impedance for reduced sensitivity to parasitic impedances in the coupling between the CMOS VLSI die 401 and the optoelectronics die 403. The signals received from the CMOS VLSI die 401 may be communicated to the unit drivers 427, which may be operable to modulate optical signals in a MZI modulator, such as the MZI 213, described with respect to FIG. 2.

Figure 5:
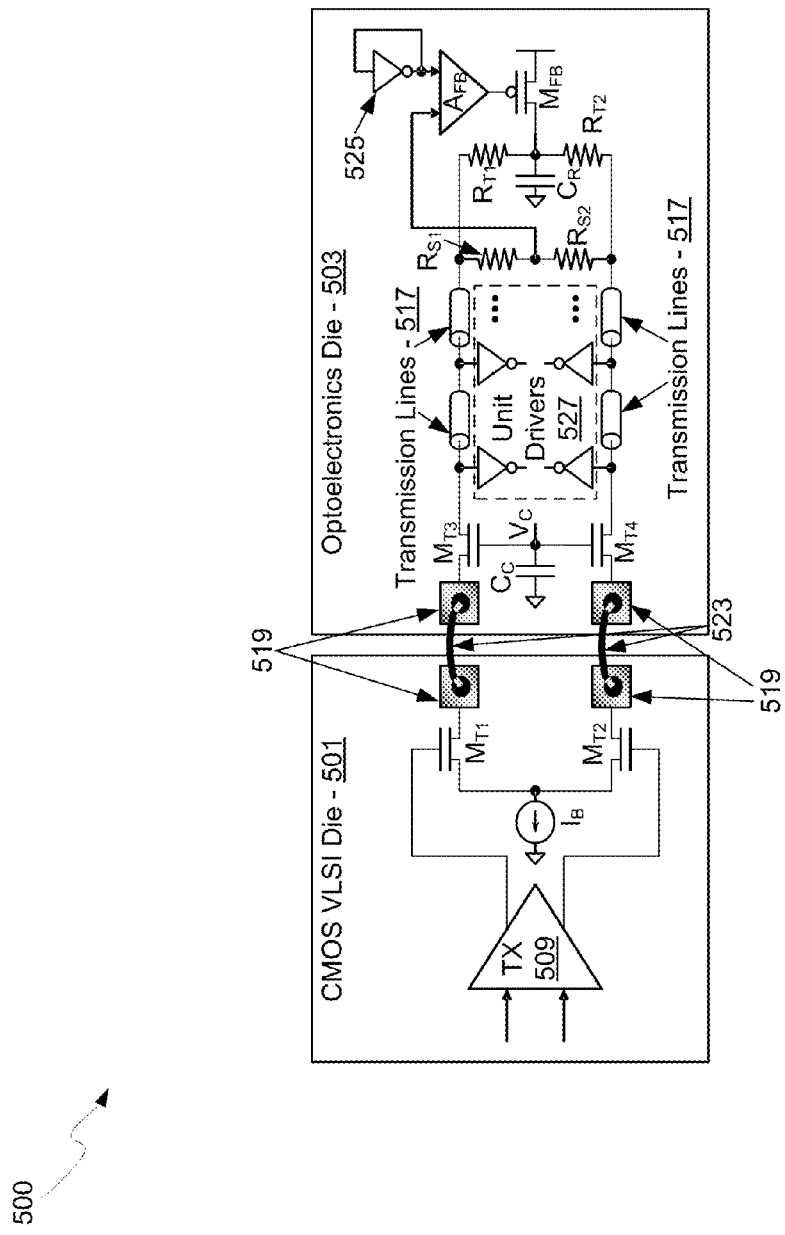
FIG. 5. is a block diagram illustrating a low-impedance split-transmitter cascode interface, in accordance with an embodiment of the invention.

FIG. 5. is a block diagram illustrating a low-impedance split-transmitter cascode interface, in accordance with an embodiment of the invention. Referring to FIG. 5, there is shown a photonically-enabled CMOS optical communication system 500 comprising a CMOS VLSI die 501, an optoelectronics die 503, and wire bonds 523.

In an exemplary embodiment, the CMOS optical communication system 500 comprises transmission lines 517 on the optoelectronics die 503 as in the controlled-impedance interface shown in FIG. 4, but also comprises a break point between the CMOS VLSI die 501 and the optoelectronics die 503 utilizing a splitting of the interface circuits in a differential cascode amplifier stage comprising the transistors $M_{T1}$-$M_{T4}$, as in the current-mode die interface, described with respect to FIGS. 2 and 3. This further lowers interface impedance compared to a directly-driven transmission line, resulting in a lower voltage swing and even less sensitivity to interconnect inductance and capacitance.

The interface comprises an open-drain differential driver on the CMOS VLSI die 501 and cascode-configured transistors on the optoelectronics die 503. The open-drain differential driver comprises a pair of NMOS transistors $M_{T1}/M_{T2}$ and the cascode transistors comprise the transistors $M_{T3}/M_{T4}$ with the drain terminals of $M_{T1}/M_{T2}$ and the source terminals of $M_{T3}/M_{T4}$ connected to the coupling pads 519 for launching differential current signals into terminated transmission lines 517 on the optoelectronics die 503. The optoelectronics die 503 also comprises a common-mode feedback loop, which matches the common-mode voltage on the transmission lines 517 to the switching threshold of the distributed amplifier stages comprising the unit drivers 527.

The CMOS VLSI die 501 may contain digital cores, such as the digital cores 205A, 205B, 305A, and 305B, described with respect to FIGS. 2 and 3, where the transmitted signal originates, as well as analog signal conditioning circuitry such as transmission line drivers. The CMOS VLSI die 501 also comprises Tx gain stages 509, a current source $I_B$, transistors $M_{T1}$ and $M_{T2}$, and coupling pads 519.

The optoelectronics die 503 comprises cascode transistors $M_{T3}$ and $M_{T4}$, capacitors $C_C$, and transmission lines 517, which may provide proper electrical to optical velocity matching for MZI operation. The optoelectronics die 503 also comprises distributed amplifier stages implemented with transistors, as illustrated schematically by the unit drivers 527. These distributed amplifiers may provide large signals to optical phase modulators in the MZI.

The optoelectronics die 503 also comprises sense resistors $R_{S1}$ and $R_{S2}$, termination resistors $R_{T1}$ and $R_{T2}$, a capacitor $C_R$, and a common-mode feedback circuit comprising a feedback gain stage AFB, a feedback control transistor $M_{FB}$, and a replica reference inverter 525. The common-mode feedback circuit may be operable to convert limited-swing current-mode logic (CML) signals to full-swing CMOS signals.

Additionally, transistors on the optoelectronics die 503 may be used to implement analog and control functions associated with the optoelectronic devices. For example, this may include low-noise voltage regulators for integrated photodetectors and calibration or real-time control loops for the MZIs to compensate for the effect of process and temperature variations. Retaining these functions on the optoelectronics die 503 reduces the total number of interconnects between the two dies and keeps sensitive analog and control nets local and isolated from possible sources of crosstalk. Digital state machines and low-speed serial communication interfaces for digital control and monitoring can also be implemented on the optoelectronics die 503 as needed.

In operation, signals for transmission may be generated in one or more digital cores in the CMOS VLSI die 501 and communicated to the gate terminals of the transistors $M_{T1}$ and $M_{T2}$ comprising a differential pair. The signal amplified by the differential pair may be communicated to the optoelectronics die 503 via the coupling pads 519, which may be coupled between die using the wire bonds 523.

The coupling between the CMOS VLSI die 501 and the optoelectronics die 503 is not limited to wire bonds, as illustrated by the wire bonds 523 in FIG. 5. Accordingly, other techniques may be utilized, such as solder balls, metal pillars, conductive resin, and/or proximity interconnects, which may comprise capacitively-coupled interfaces or inductively-coupled interfaces, for example. Capacitively-coupled interfaces may comprise the coupling pads 519 on adjacent chips comprising capacitors for AC-coupling of signals, whereas inductively-coupled interfaces may comprise inductor coils on adjacent chips with signals being communicated between chips via inductive coupling between the coils.

The transmission lines 517 may provide tunable impedances for matching to prior gain stages, such as the differential pair $M_{T1}$ and $M_{T2}$. The low impedance at the source terminals of the cascode transistors $M_{T3}$ and $M_{T4}$ provide reduced sensitivity to parasitic impedances in the coupling between the CMOS VLSI die 501 and the optoelectronics die 503. The signals received from the CMOS VLSI die 501 may be communicated to the unit drivers 527, which may be operable to modulate optical signals in a MZI modulator, such as the MZI 213, described with respect to FIG. 2.

In an embodiment of the invention, a method and system are disclosed for communicating electrical signals between an electronics die 201, 301, 401, and 501 and an optoelectronics die 203, 303, 403, and 503 via coupling pads 219, 319, 419, and 519 on the electronics die 201, 301, 401, and 501 and the optoelectronics die 203, 303, 403, and 503 in an optical communication system 200, 300, 400, and 500. The coupling pads 219, 319, 419, and 519 may be located in low impedance points in one or more transmit paths and/or one or more receive paths in the photonically-enabled CMOS optical communication system 200, 300, 400, and 500.

The electrical signals may be communicated via one or more current-mode interfaces that may comprise a cascode amplifier stage split between source terminals of transistors $M_{C1}$, $M_{C2}$, $M_{T1}$, $M_{T2}$, $M_{2A}$, and $M_{2B}$ on the electronics die 201, 301, 401, and 501 and drain terminals of transistors $M_{CS1}$, $M_{CS2}$, $M_{T3}$, $M_{T4}$, $M_{1A}$, and $M_{1B}$ on the optoelectronics die 203, 303, 403, and 503. The electrical signals may be communicated via one or more controlled-impedance interfaces that may comprise one or more transmission line drivers 209 and 409 on a first die and one or more transmission lines 217, 417, and 517 on a second die of the optical communication system 200, 300, 400, and 500. The electrical signals may be communicated via one or more capacitively-coupled interfaces that may comprise capacitors formed by one or more of the contact pads 219, 319, 419, and 519 on the electronics die 201, 301, 401, and 501 and one or more of the contact pads on the optoelectronics die 203, 303, 403, and 503. The electrical signals may be communicated via one or more inductively-coupled interfaces. The coupling pads 219, 319, 419, and 519 may be connected via one or more of: wire bonds 223, 423, and 523, metal pillars 319, solder balls, or conductive resin. The electronics die 201, 301, 401, and 501 and the optoelectronics die 203, 303, 403, and 503 may be coupled in a flip-chip configuration.

While the invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A method for processing signals, the method comprising:

in an optical communication system, communicating electrical signals between an electronics die and an optoelectronics die via coupling pads on said electronics die and said optoelectronics die, wherein said coupling pads are located at low impedance points between two cascode transistors in one or more transmit paths and/or one or more receive paths in said optical communication system, wherein a first of said two cascode transistors is integrated in said electronics die and a second of said two cascode transistors is integrated in said optoelectronics die.

2. The method according to claim 1, comprising communicating said electrical signals via one or more current-mode interfaces.

3. The method according to claim 2, wherein said one or more current-mode interfaces comprise a cascode amplifier stage split between a source terminal of said first of said two cascode transistors integrated in said electronics die and a drain terminal of said second of said two cascode transistors integrated in said optoelectronics die.

4. The method according to claim 2, wherein said one or more current-mode interfaces comprise a cascode amplifier stage split between a source terminal of said first of said two cascode transistors integrated in said optoelectronics die and a drain terminal of said second of said two cascode transistors integrated in said electronics die.

5. The method according to claim 1, comprising communicating said electrical signals via one or more controlled-impedance interfaces.

6. The method according to claim 5, wherein said one or more controlled-impedance interfaces comprise one or more transmission line drivers on a first die and one or more transmission lines on a second die of said optical communication system.

7. The method according to claim 1, comprising communicating said electrical signals via one or more capacitively-coupled interfaces.

8. The method according to claim 7, wherein said capacitively-coupled interfaces comprise capacitors formed by one or more of said contact pads on said electronics die and one or more of said contact pads on said optoelectronics die.

9. The method according to claim 1, comprising communicating said electrical signals via one or more inductively-coupled interfaces.

10. The method according to claim 1, wherein said coupling pads are connected via one or more of: wire bonds, metal pillars, solder balls, or conductive resin.

11. The method according to claim 1, wherein said electronics die and said optoelectronics die are coupled in a flip-chip configuration.

12. The method according to claim 1, wherein said electronics die comprises a complimentary metal-oxide-semiconductor (CMOS) die.

13. The method according to claim 1, wherein said optoelectronics die comprises a CMOS die.

14. A system for processing signals, the system comprising:
an optical communication system comprising an electronics die and an optoelectronics die, said electronics die and said optoelectronics die comprising circuitry that is operable to communicate electrical signals between said electronics die and said optoelectronics die via coupling pads on said electronics die and said optoelectronics die, wherein said coupling pads are located at low impedance points between two cascode transistors in one or more transmit paths and/or one or more receive paths in said optical communication system, wherein a first of said two cascode transistors is integrated in said electronics die and a second of said two cascode transistors is integrated in said optoelectronics die.

15. The system according to claim 14, wherein said circuitry is operable to communicate said electrical signals via one or more current-mode interfaces.

16. The system according to claim 15, wherein said one or more current-mode interfaces comprise a cascode amplifier stage split between a source terminal of said first of said two cascode transistors integrated in said electronics die and a drain terminal of said second of said two cascode transistors integrated in said optoelectronics die.

17. The system according to claim 15, wherein said one or more current-mode interfaces comprise a cascode amplifier stage split between a source terminal of said first of said two cascode transistors integrated in said optoelectronics die and a drain terminal of said second of said two cascode transistors integrated in said electronics die.

18. The system according to claim 14, wherein said circuitry is operable to communicate said electrical signals via one or more controlled-impedance interfaces.

19. The system according to claim 18, wherein said one or more controlled-impedance interfaces comprise one or more transmission line drivers on a first die and one or more transmission lines on a second die of said optical communication system.

20. The system according to claim 14, wherein said circuitry is operable to communicate said electrical signals via one or more capacitively-coupled interfaces.

21. The system according to claim 20, wherein said capacitively-coupled interfaces comprise capacitors formed by one or more of said contact pads on said electronics die and one or more of said contact pads on said optoelectronics die.

22. The system according to claim 14, wherein said circuitry is operable to communicate said electrical signals via one or more inductively-coupled interfaces.

23. The system according to claim 14, wherein said coupling pads are connected via one or more of: wire bonds, metal pillars, solder balls, or conductive resin.

24. The system according to claim 14, wherein said electronics die and said optoelectronics die are coupled in a flip-chip configuration.

25. The system according to claim 14, wherein said electronics die comprises a complimentary metal-oxide-semiconductor (CMOS) die.

26. The system according to claim 14, wherein said optoelectronics die comprises a CMOS die.

* * * * *